(12) United States Patent
Dinh et al.

(10) Patent No.: US 7,591,442 B2
(45) Date of Patent: Sep. 22, 2009

(54) PIPE CLAMP

(75) Inventors: Cong Thanh Dinh, Collierville, TN (US); Joey D. Magno, Jr., Cordova, TN (US); Charles E. Whipple, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 362 days.

(21) Appl. No.: 11/192,866

(22) Filed: Jul. 29, 2005

(65) Prior Publication Data

US 2006/0027715 A1 Feb. 9, 2006

Related U.S. Application Data

(60) Provisional application No. 60/599,162, filed on Aug. 5, 2004.

(51) Int. Cl.
*F16L 3/00* (2006.01)

(52) U.S. Cl. .................... 248/73; 248/74.4; 248/62; 248/67.7

(58) Field of Classification Search .............. 248/74.1, 248/74.4, 62, 67.7, 73, 72, 71, 68.1; 24/279
See application file for complete search history.

(56) References Cited

U.S. PATENT DOCUMENTS

| | | | |
|---|---|---|---|
| 421,907 A | | 2/1890 | Casler |
| 649,916 A | * | 5/1900 | Dietrich ........................ 24/279 |
| 1,373,673 A | * | 4/1921 | Ritter ........................... 24/279 |
| 2,176,405 A | | 10/1939 | Lombard |
| 2,205,135 A | * | 6/1940 | Eggerss ......................... 24/279 |
| 2,368,929 A | * | 2/1945 | King ............................ 24/279 |
| 2,375,513 A | | 5/1945 | Bach |
| 2,390,750 A | | 12/1945 | Tinnerman |
| 2,764,791 A | | 10/1956 | Bedford, Jr. |
| 2,846,169 A | | 8/1958 | Sullivan |
| 2,863,203 A | * | 12/1958 | Dalpiaz ........................ 24/279 |

(Continued)

FOREIGN PATENT DOCUMENTS

CA 2005007 10/1995

(Continued)

OTHER PUBLICATIONS

"Fiberglass Strut Support Systems & Fasteners" (Pipe Clamps), Product Information from Aickinstrut, 4 pages (#34 and #18) (Publication Date Unknown).

(Continued)

*Primary Examiner*—J. Allen Shriver, II
*Assistant Examiner*—Bradley H Duckworth
(74) *Attorney, Agent, or Firm*—Hoffmann & Baron, LLP

(57) ABSTRACT

A pipe clamp is used to secure an elongate article, such as a pipe, to a structural channel. The pipe clamp includes a pair of elongate clamping straps for positioning about the article. Each strap includes an attachment end for attaching to the structural channel an intermediate portion for wrapping around the article and a connection end. A threaded fastener extends through the connection ends to couple the strap around the article. Each connection end is of different length and includes a receiving aperture therethrough such that the fastener extending through the apertures extends at an oblique angle with respect to a center line passing through the article perpendicular to the structural channel.

11 Claims, 3 Drawing Sheets

U.S. PATENT DOCUMENTS

| | | | |
|---|---|---|---|
| 2,863,625 A | 12/1958 | Attwood | |
| 2,891,296 A | 6/1959 | Darde | |
| 2,916,237 A * | 12/1959 | Bertling et al. | 248/67.7 |
| 2,938,742 A | 5/1960 | Teator | |
| 2,998,217 A | 8/1961 | Englis et al. | |
| 3,066,903 A | 12/1962 | Tinnerman | |
| 3,167,286 A | 1/1965 | Sherburne | |
| 3,185,419 A | 5/1965 | Kindorf | |
| 3,226,069 A | 12/1965 | Clarke | |
| 3,276,800 A | 10/1966 | Loudon et al. | |
| 3,310,264 A * | 3/1967 | Appleton | 248/72 |
| 3,317,167 A * | 5/1967 | Becker et al. | 248/73 |
| 3,370,815 A | 2/1968 | Opperhauser | |
| 3,417,951 A | 12/1968 | Rebentisch, Jr. | |
| 3,463,428 A | 8/1969 | Kindorf et al. | |
| 3,486,726 A | 12/1969 | Kindorf et al. | |
| 3,522,921 A | 8/1970 | Lytle | |
| 3,527,432 A | 9/1970 | Lytle | |
| 3,532,311 A | 10/1970 | Havener | |
| 3,547,385 A | 12/1970 | Kindorf | |
| 3,599,921 A * | 8/1971 | Cumber | 248/317 |
| 3,650,449 A | 3/1972 | Mundus | |
| 1,278,732 A | 6/1972 | Urbigkeit et al. | |
| 4,044,428 A | 8/1977 | Kowalski | |
| 4,046,344 A | 9/1977 | Scanlan | |
| 4,059,872 A | 11/1977 | Delesandri | |
| 4,157,800 A | 6/1979 | Senter et al. | |
| 4,185,802 A | 1/1980 | Myles et al. | |
| 4,417,711 A | 11/1983 | Madej | |
| 4,479,625 A * | 10/1984 | Martz | 248/74.1 |
| 4,516,296 A | 5/1985 | Sherman | |
| 4,630,647 A * | 12/1986 | Thomson | 138/99 |
| 4,730,800 A * | 3/1988 | Engman | 248/67 |
| 4,757,965 A | 7/1988 | Allen | |
| 4,783,040 A | 11/1988 | Lindberg et al. | |
| 4,790,060 A | 12/1988 | Council et al. | |
| 5,056,196 A * | 10/1991 | van Walraven | 24/279 |
| 5,141,186 A * | 8/1992 | Cusic | 248/73 |
| 5,163,644 A | 11/1992 | Kowalski | |
| D333,087 S | 2/1993 | Tekirian | |
| 5,216,784 A | 6/1993 | Dyer | |
| 5,234,185 A | 8/1993 | Hoffman et al. | |
| 5,274,888 A | 1/1994 | Payne | |
| 5,330,216 A | 7/1994 | Schnell | |
| 5,384,936 A * | 1/1995 | Van Walraven | 24/279 |
| 5,478,033 A | 12/1995 | Hungerford, Jr. | |
| 5,647,563 A | 7/1997 | Gantner et al. | |
| 5,653,481 A | 8/1997 | Alderman | |
| 5,697,585 A | 12/1997 | Hungerford, Jr. | |
| 5,738,386 A | 4/1998 | Barefoot et al. | |
| 5,772,258 A | 6/1998 | Dyer et al. | |
| 5,794,896 A | 8/1998 | Hungerford, Jr. | |
| 5,855,342 A | 1/1999 | Hawkins et al. | |
| 5,893,538 A | 4/1999 | Onishi et al. | |
| 5,944,365 A | 8/1999 | Kizler et al. | |
| 6,105,216 A | 8/2000 | Opperthauser | |
| 6,126,122 A | 10/2000 | Ismert | |
| 6,138,960 A | 10/2000 | Carbonare et al. | |
| 6,305,650 B1 | 10/2001 | Hawkins et al. | |
| 6,308,921 B1 | 10/2001 | Borzucki | |
| 6,431,502 B1 * | 8/2002 | Goodman | 248/74.1 |
| 6,446,915 B1 | 9/2002 | Ismert | |
| 6,494,415 B1 * | 12/2002 | Roth | 248/74.1 |
| 6,679,461 B1 | 1/2004 | Hawkins | |
| D538,148 S * | 3/2007 | Dinh et al. | D8/396 |

FOREIGN PATENT DOCUMENTS

| | | |
|---|---|---|
| DE | 4015404 | 12/1991 |
| FR | 1524213 | 5/1968 |

OTHER PUBLICATIONS

ERICO Product Search, wyslwyg://20/http://www.erico.com/erico_p.../caddycfcbrkaprtonepiecestrutcimpmore.asp, (2 pages) Jul. 5, 2002.

* cited by examiner

PIPE CLAMP

CROSS-REFERENCE TO RELATED APPLICATIONS

This application claims priority to U.S. Provisional Application No. 60/599,162, filed Aug. 5, 2004.

FIELD OF THE INVENTION

The present invention relates generally to a clamp for securing elongate articles, such as a pipe, to a structural channel. More particularly, the present invention is directed to an improved pipe clamp which quickly and securely supports pipes to a structural channel.

BACKGROUND OF THE INVENTION

It is well known to employ pipe clamps to secure elongate articles, such as pipes, conduits and the like to structural channels. Structural channels are generally U-shaped members having upper ends including inwardly turned flanges, which support thereacross pipes or other elongated articles. The pipe clamp, which is typically a two piece member, is positioned over the pipe and secured to the channel around the pipe to support the pipe to the structural member. A fastener such as a bolt secures the two pieces together.

Typically pipe clamps of this type include a pair of straps which are identical. Each strap includes an attachment portion which includes hook-like feet which engage the inwardly turned flanges of the U-shaped channel, an intermediate portion for wrapping around the pipe and a connection portion extending outwardly therefrom. The connection portion extends upwardly beyond the pipe and includes aligned apertures therethrough. The apertures accommodate a fastening member, such as a threaded bolt, which may be threadingly secured therethrough to tighten the straps around the pipe thereby securing the pipe to the structural channel.

One example of a pipe clamp of this type is shown in U.S. Pat. No. 3,547,385. As may be appreciated, the pipe clamp must support the pipe to the structural channel in a fashion where a load placed on the pipe will not dislodge the pipe from the structural channel. The particular design of conventional pipes clamps serves adequately to secure the pipe to the channel, inasmuch as the identical formation of the individual pipe straps assures that the load placed on the pipe will be equally distributed to each strap.

In certain instances, a single structural channel may support a plurality of pipes in side by side, spaced fashion. An individual pipe clamp is used to secure each of the pipes to the structural channel. However, when the pipes are arranged in such close side by side fashion, it is often difficult to access the bolt extending through the connection ends of the straps to tighten the pipe clamp. Positioning of one clamp immediately next to another clamp hinders access to the bolt making installation difficult.

In order to permit access to the bolt which tightens the straps together, the art has seen an improvement in the conventional pipe clamps used in side by side arrangements. U.S. Pat. Nos. 4,757,965 and 5,163,644 each show pipe clamps having connection ends extending beyond the bolt. The connection ends are bent or twisted so as to be aligned at an angle with respect to the extending pipe. In these example the fastener or bolt is therefore inserted at an angle with respect to the pipe so that the head of the bolt is accessible for tightening even where pipe clamps are installed in a close side by side relationship.

While the arrangement shown in the above-referenced patents overcomes many of the disadvantages of prior pipe clamps, this arrangement requires the connection portions of the strap to be bent or twisted during manufacture. This may have a tendency to greatly reduce the strength of the pipe clamp, reducing the load which may be supported by the pipe.

A further technique to allow pipe clamps to be placed in close side by side relationship is shown in U.S. Pat. No. 5,141,186. In this example, the pipe clamp includes straps of unequal length so that the extending connection ends are located to one side and at an angle to the pipe extending across the structural channel. The threaded fastener is thereby centrally offset and extends at an angle with respect to the pipe in such a manner that the head of the bolt is directed upwardly with respect to the pipe rather than across the pipe. This allows access to the head of the bolt where the pipe clamps are placed in close side by side relationship. While this arrangement allows for tightening of the bolt of the pipe clamp where the pipes supports are in close proximity, the unequal nature of the pipe straps of this example result in stresses being unequally applied to the individual straps of the clamp. This also may result in the pipe being unable to support excessive loads.

Therefore it is desirable to provide an improved pipe clamp which securely supports the pipe to a structural channel and which may be easily accessed where the pipes are arranged in close proximity.

SUMMARY OF THE INVENTION

A pipe clamp is provided for securing an elongate article, such as a pipe, to a structural channel. The pipe clamp includes a pair of elongate clamping straps for positioning about the article. Each strap has an attachment end for attaching to a structural channel, an intermediate portion for wrapping around the article and a connection end. A threaded fastener extends through the connection ends to couple the strap around the article and to the structural channel. The intermediate portion of the strap terminates at a location substantially equal distant from a center line of the article extending perpendicular to the structural channel. Each of the connection ends has a fastener receiving aperture spaced a given distance from the terminating location of the intermediate portions. The given distance of one strap is greater than the given distance of the other strap as to position the fastener at an oblique angle with respect to the center line.

The present invention also provides a pipe clamp where the fastener is inserted through the connection ends portions, such that the fastener extends at an oblique angle and substantially overlies a center line extending through an article perpendicular to the structure channel.

Further, the pipe clamp of present invention provides for one of the connection portions to include a threaded aperture accommodating a threaded shaft of the fastener. A key hole slot is in the other connection portion so that the key hole slot insertably receives the head of the fastener.

DETAILED DESCRIPTION OF THE PREFERRED EMBODIMENTS

The present invention provides a pipe clamp which may be used to secure a pipe or other elongate article to a structural channel and wherein, a plurality of pipes can be supported by a plurality of pipe clamps in close side by side proximity.

Figure 1:
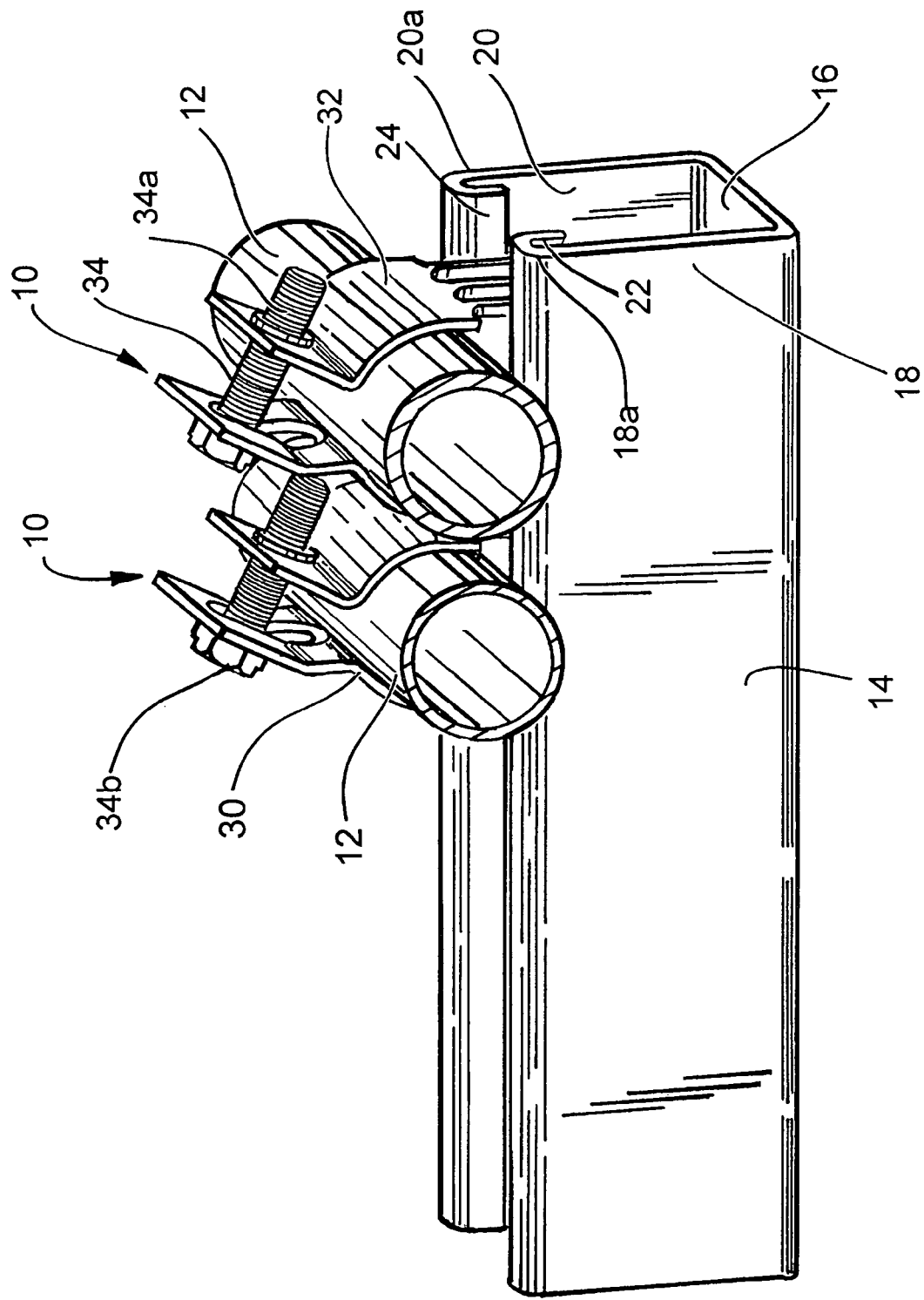
FIG. 1 is a perspective showing of pipe clamp of the present invention shown supporting elongate articles, such as pipes, to a structural channel.
Figure 2:
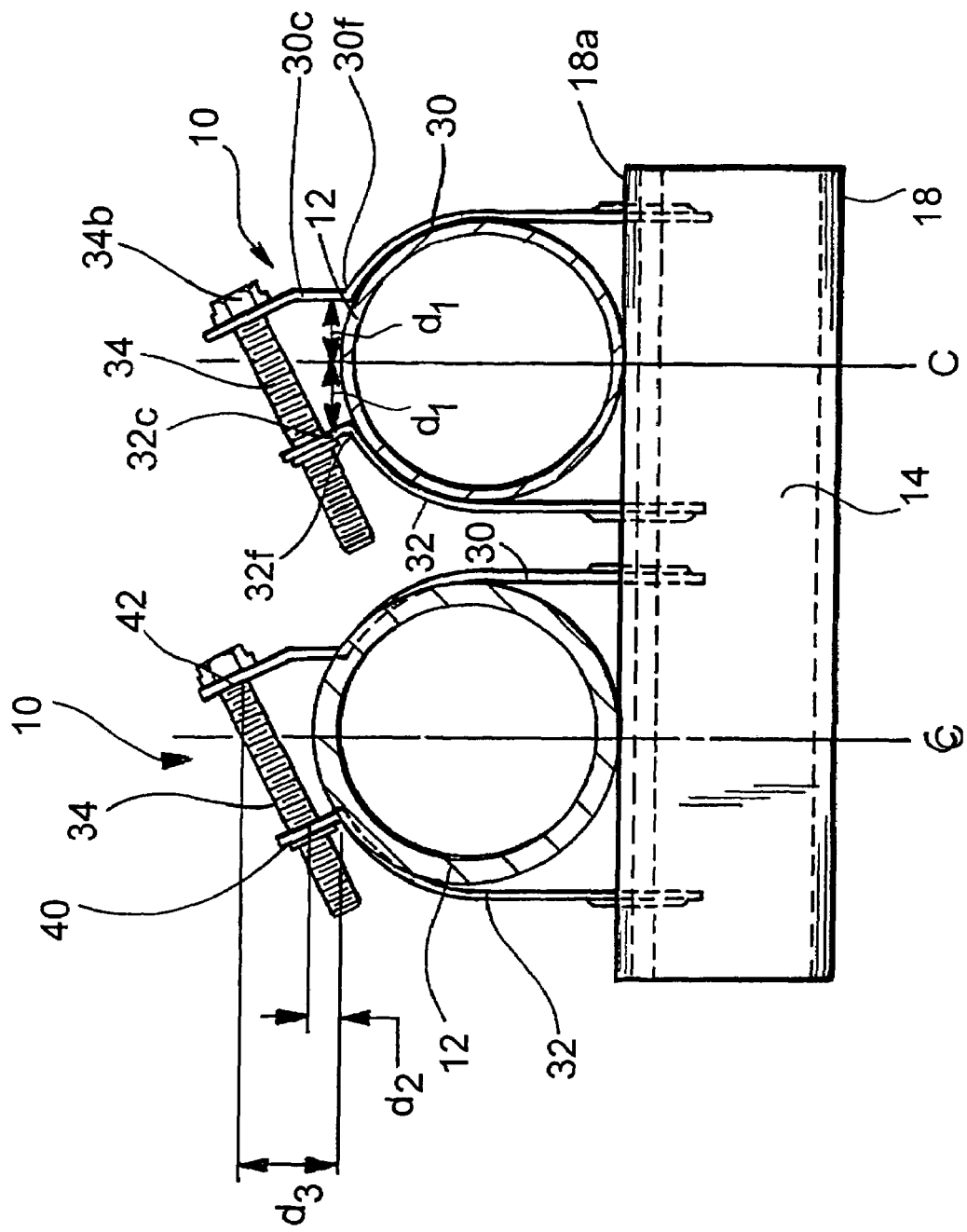
FIG. 2 is a front plan view of the pipe clamps of FIG. 1.

Referring to FIGS. 1 and 2, a pair of pipe clamps 10 of the present invention are shown supporting elongated articles 12 to a structural channel 14. In the present embodiment, each clamp 10 may support a pipe, conduit, cable or other elongate article to the structural channel 14. For brevity, the term "pipe" will be used to refer to the elongate articles as shown in FIGS. 1 and 2.

Structural channel 14 is of conventional construction having a generally U-shaped cross-section defined by a bottom wall 16 and spaced apart upwardly extending side walls 18 and 20. The upper extents 18a and 20a of side walls 18 and 20 include inwardly directed flanges 22 and 24, respectively. Also as shown, one or more pipes 12 may be positioned perpendicularly across the channel 14 so as to be supported on top of the inwardly turned flanges 18 and 20.

Each pipe clamp 10 of the present invention includes a pair of complementary clamp straps 30 and 32 and a threaded bolt 34 which is used to secure the straps together around pipe 12 as will be described in further detail herein below. Straps 30 and 32 of pipe clamp 12 are elongate preferably metallic members manufactured into an integral configuration. The straps 30 and 32 are formed from a strip of metal and are stamped and formed into the configuration shown in FIG. 3. The two clamp straps, 30 and 32, are manufactured to be frangibly attached at the central location 36 which allows the straps and the attached bolt 34 to be shipped in a one piece configuration. During use, the individual straps 30 and 32 are severed from one another at the frangible location 36.

Each clamp strap, 30 and 32, includes an attachment end, 30a and 32a, respectively, a curved intermediate portion 30b and 32b and an opposed connection end, 30c and 32c. Each attachment end 30a, 32a, includes a hook-like foot portion 30d and 32d which is used in conventional fashion to attach the pipe strap to the inwardly turned flanges 22 and 24 of channel 14. In order to provide additional strength to the attachment end, each attachment end includes a pair of strengthening ribs, 30e and 32e. It is also conceivable to roll the edges of attachment end 30a and 32a rather than punch it out cleanly so as to provide additional strength to this portion of the clamp.

Intermediate portions 30b and 32b of straps 30 and 32 are mutually inwardly curved so as to wrap around pipe 12. The curved intermediate portions 30b and 32b terminate at distal locations, 30f and 32f, from which point, connection ends 30c and 32c extend.

Connection end 32c is generally planar having a central inwardly threaded aperture 40 therethrough which accommodates the threaded shaft 34a of bolt 34. It is contemplated that bolt 34 is preassembled in threaded aperture 40 for shipment and use. Connection end 30c of strap 30 is an elongate member having a key-hole like aperture 42 therethrough. Aperture 42 has a narrow upper extent 42a and a wider lower extent 42b. It is comtemplated that the head 34b of bolt 34 may be easily inserted through wider extent 42b of aperture 42 and then moved to the narrow extent 42a so that the bolt can be tightened between aperture 42 and aperture 40 to secure the connection ends 30c and 32c of straps 30 and 32 together. Such an arrangement is shown in FIGS. 1 and 2. The key-hole arrangement of aperture 42 allows the installer to secure the connection ends of 30c and 32c of straps 30 and 32 together without having to remove the bolt 34 from aperture 40.

Referring more specifically to FIG. 2, clamps 10 are shown installed over pipes 12. In accordance with the present invention, the hook-like feet, 30a and 32a of attachment ends 30 and 32 are engaged under the inwardly turned flanges 22 and 24 of channel 14. The straps 30 and 32 are then placed around pipe 12.

In the present invention, it is noted that the termination location 30f and 32f of straps 30 and 32 terminate at a location which is generally equidistant from a center line C extending through pipe 12 perpendicular to the longitudinal extent of channel 14. A distance d1 exists between centerline C and termination locations 30f and 32f. As the curved intermediate portions 30b and 32b support the pipe, providing a pipe strap which wraps around pipe 12 equally with respect to each strap, serves to equally distribute the load between the two pipe straps enabling the clamp to support a greater load placed on the pipe.

Figure 3:
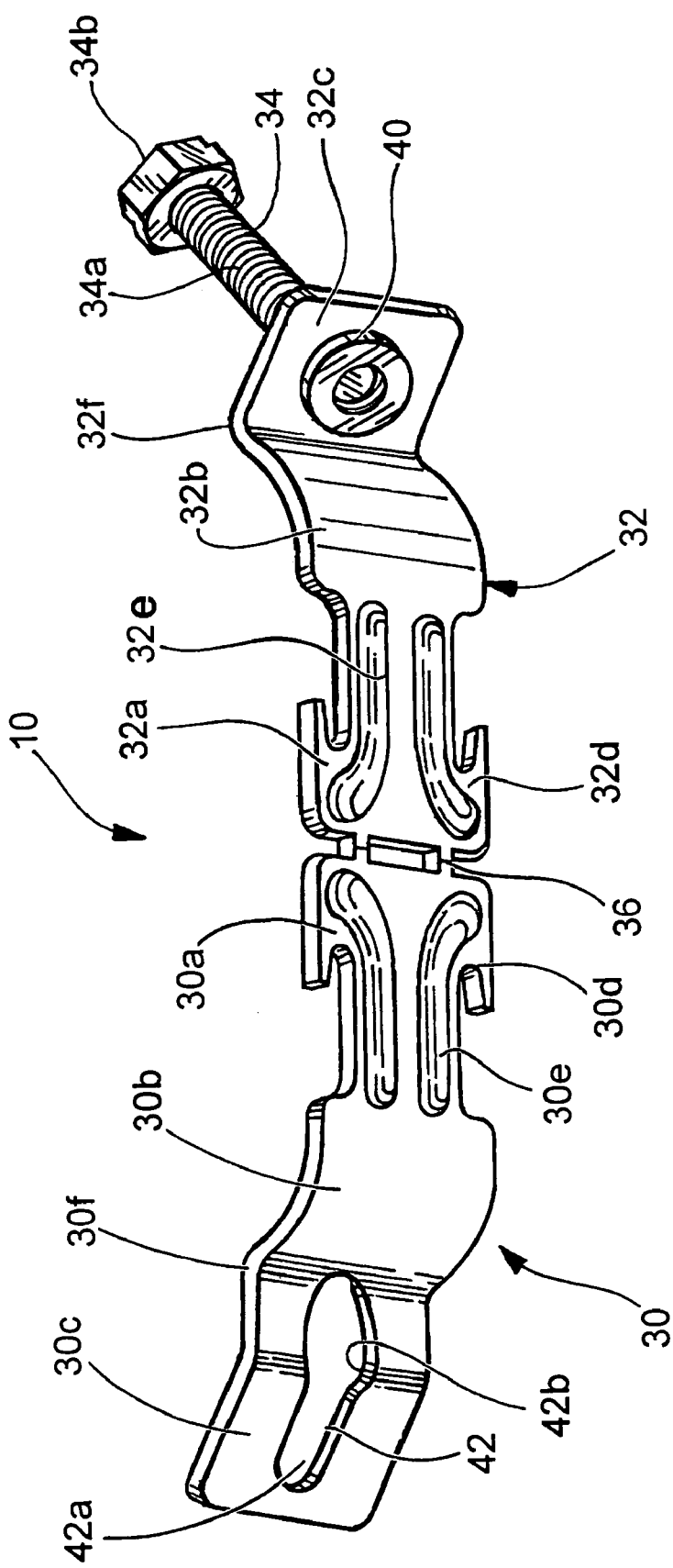
FIG. 3 is a perspective showing of the pipe clamp of the present invention shown in its pre-installed shipping condition.

Moreover, as particularly shown in FIGS. 2 and 3, the connection ends 30c and 32c extend in such a fashion such that the apertures 40 and 42 are located at different distances with respect to the pipe 12. Aperture 40 of connection portion 32c extends a given distance above pipe 12 of d2. Narrow portion 42a of aperture 42, which accommodates in final location the head of 34b of bolt 34, is located a given distance d3 above pipe 12. Length d3 is substantially greater than length d2 such that when bolt 34 is properly attached between connection portions 30c and 32c, bolt 34 will extend at an oblique angle with respect to the center line C extending through pipe 12. This allows the head 34b of bolt 34 to be accessed for clamping purposes, even where two pipe straps are placed in close proximity as shown in FIGS. 1 and 2.

This arrangement of straps 30 and 32 and the equidistant placement of terminating locations 30f and 32f position bolt 34 over centerline C assures that the pipe straps 30 and 32 equally support load placed on pipe 12. Additionally, such an arrangement places the bolt 34 centrally located above pipe 12 rather than offset to one side. Such an arrangement allows the pipes and the corresponding pipe strap to be placed on closer centers as the shaft 34a of one bolt does not interfere with the next adjacent pipe clamp.

Various changes to the foregoing described and shown structures would now be evident to those skilled in the art. Accordingly, the particularly disclosed scope of the invention is set forth in the following claims.

The invention claimed is:

1. A pipe clamp for securing an elongate article to a structural channel, comprising:

a pair of elongated clamping straps for positioning about said article, each said strap has an attachment end for attachment to said structural member, an intermediate portion for wrapping around said article and a connection end; and a threaded fastener extending through said connection ends to couple said strap about said article and secure said article to said structural channel;

said intermediate portion of said straps terminating at a location substantially equidistant from a center line of said clamp extending perpendicularly to said structural channel and forming a receiving space for receiving said article; and each of said connection ends having a fastener receiving aperture spaced a given distance from said terminating location of said intermediate portions, said given distance of one said strap being greater than the given distance of the other said strap so as to position said fastener on an angle oblique to said center line, wherein said connection end includes apertures therein for receiving said fastener, said aperture of one connection end being located closer to said article receiving space than the aperture of the other connection end.

2. A pipe clamp of claim 1 wherein said connection ends extend from said termination location at an oblique angle with respect to said centerline.

3. A pipe clamp of claim 2 wherein one of said fastener receiving apertures is internally threaded for threaded receipt of said fastener.

4. A pipe clamp of claim 3 wherein the other of said fastening receiving apertures includes a key-hole slot for insertably receiving an elongate head of said fastener.

5. A pipe clamp of claim 1 wherein said pair of clamping straps are integrally formed a frangibly severable.

6. A pipe clamp for securing an elongate article to a structural channel, comprising:
    a pair of elongated clamping straps for positioning about said article, each said strap has an attachment end for attachment to said structural channel, an intermediate portion for wrapping around said article and a connection end; and
    a threaded fastener extending through said connection ends to couple said strap about said article and secure said article to said structural channel;
    said fastener being insertable through said connection end portions such that said fastener extends at an oblique angle and substantially overlies a center line extending through said clamp perpendicular to said structural channel;
    wherein said connection end includes aperture therein for receiving said fastener, said aperture of one connection end being located closer to said intermediate portion than the aperture of the other connection end.

7. A pipe clamp of claim 6 wherein one of said fastener receiving apertures is internally threaded for threaded receipt of said fastener.

8. A pipe clamp of claim 7 wherein the other of said fastening receiving apertures includes a key-hole slot for insertably receiving an elongate head of said fastener.

9. A pipe clamp of claim 4 wherein said key-hole aperture includes a wider extent for insertably receiving said head and a narrow extent for seating said head.

10. A pipe clamp of claim 9 wherein said threaded aperture is located closer to said intermediate portion than said narrow extent of said key-hole aperture.

11. A pipe clamp of claim 10 wherein said fastener substantially overlies a centerline extending through said clamp perpendicular to said structural channel.

* * * * *

UNITED STATES PATENT AND TRADEMARK OFFICE
CERTIFICATE OF CORRECTION

PATENT NO. : 7,591,442 B2  
APPLICATION NO. : 11/192866  
DATED : September 22, 2009  
INVENTOR(S) : Dinh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 166 days.

Signed and Sealed this

Twenty-first Day of September, 2010

David J. Kappos  
*Director of the United States Patent and Trademark Office*